UNITED STATES PATENT OFFICE.

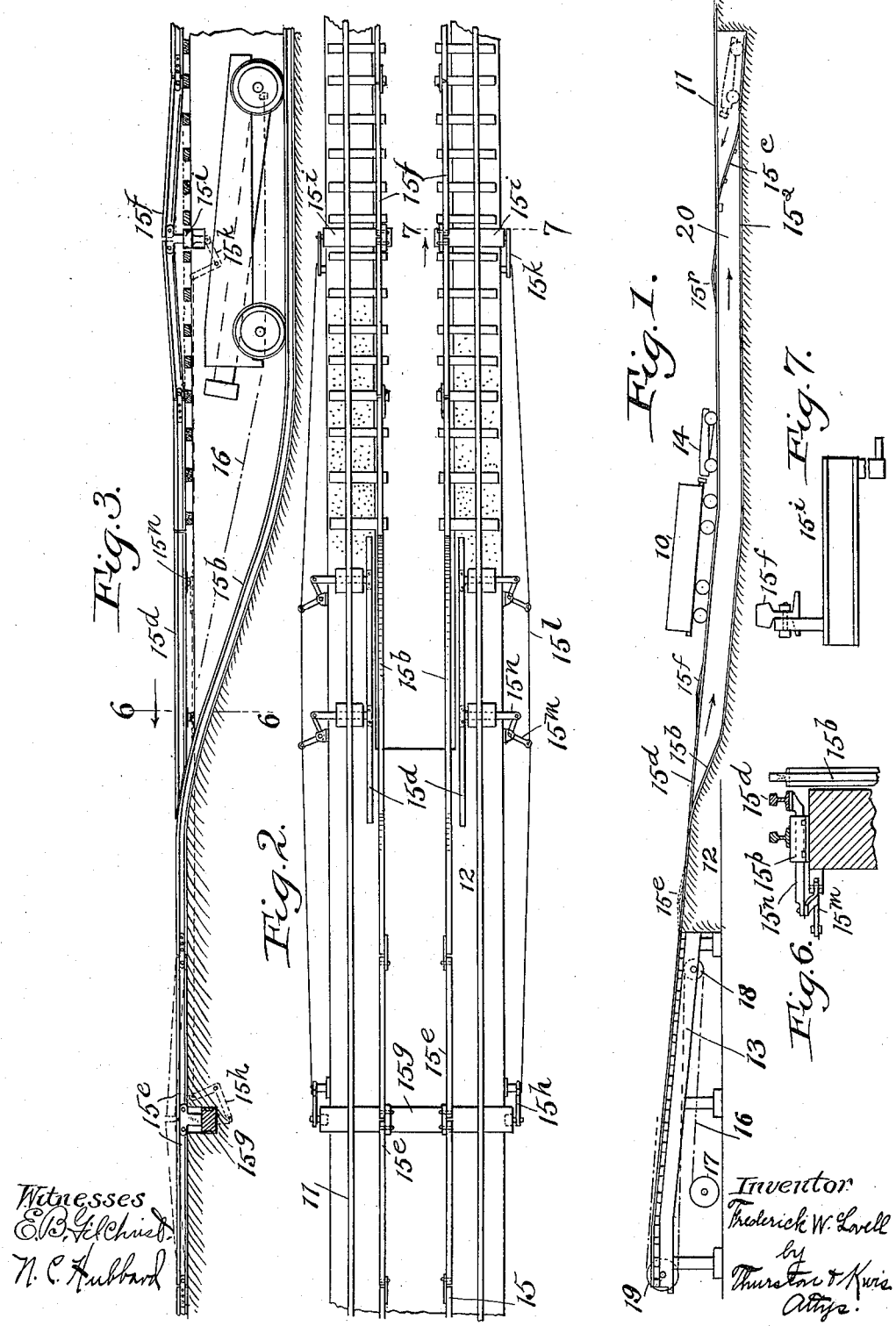

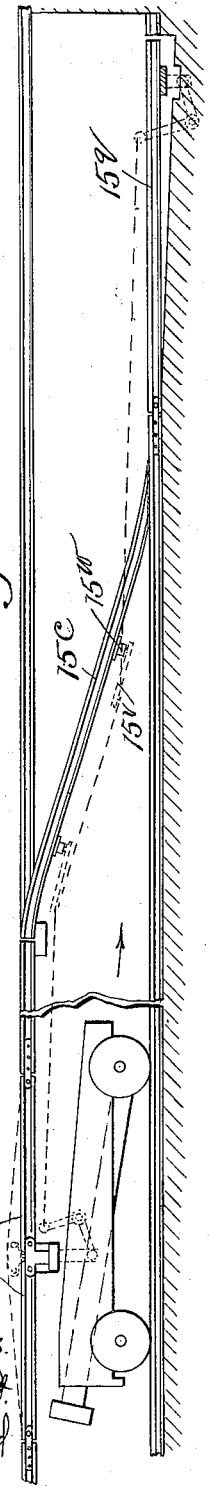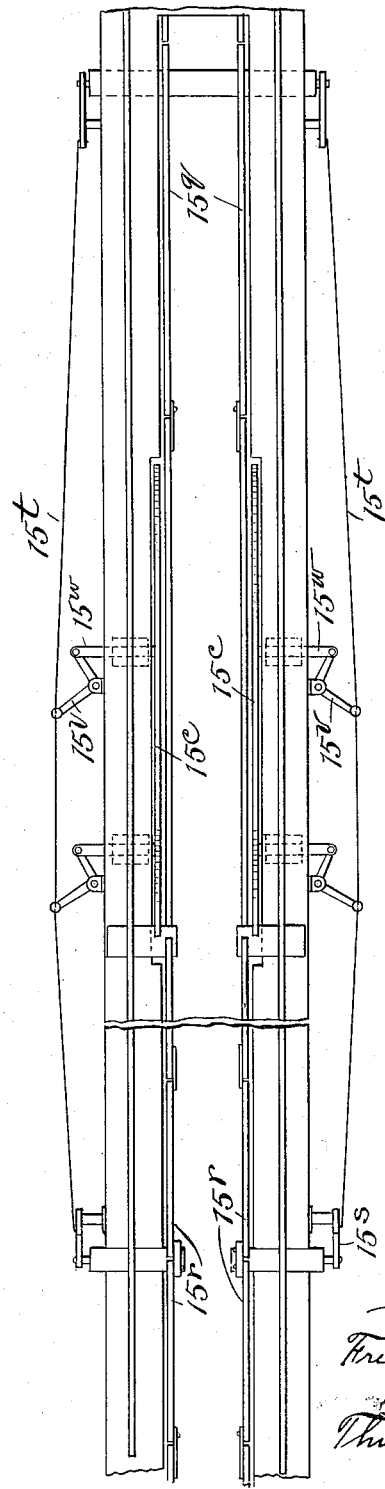

FREDERICK W. LOVELL, OF CLEVELAND, OHIO, ASSIGNOR TO THE McMYLER INTER-STATE COMPANY, OF CLEVELAND, OHIO, A CORPORATION OF OHIO.

CAR-HAULAGE PLANT.

1,155,748.  Specification of Letters Patent.  Patented Oct. 5, 1915.

Application filed March 12, 1913. Serial No. 753,671.

*To all whom it may concern:*

Be it known that I, FREDERICK W. LOVELL, a citizen of the United States, residing at Cleveland, in the county of Cuyahoga and State of Ohio, have invented a certain new and useful Improvement in Car-Haulage Plants, of which the following is a full, clear, and exact description.

This invention relates to car haulage plants, of the general type which is used in connection with various kinds of car handling apparatus, such as car dumpers.

At the present time, loaded cars are brought up onto the cradle of a car dumper by a haulage plant or system which includes suitable tracks, and a haulage car which is adapted to push a loaded car up along the upwardly inclined approach to the cradle, the haulage car being a small wheel truck or car which runs along the rails of a narrow gage track between the rails of the main track, for the loaded cars. Loaded cars are usually retained on an elevated track prior to being brought to the unloader, and are allowed to run by gravity down a section of the track to a point at or adjacent the foot of the upwardly inclined approach to the car dumper. In order that the cars may be pushed from the point referred to up onto the unloader, the track for the haulage car terminates in a pit into which the haulage car is adapted to pass, in order that a loaded car coming down the incline may pass to a point in advance of the haulage car, the car stopping usually a short distance in advance of the pit. As soon as the car reaches this point, the haulage car may be brought from the pit up to the car, and then by a suitable cable attached to the haulage car, the latter is caused to push the car up the approach or trestle leading to the cradle of the car dumper. This system, while satisfactory in many respects, has the disadvantage that a loaded car cannot be moved down the incline toward the car dumper until after the haulage car is in the pit. The cars cannot with safety be started down the incline until after the haulage car is in the pit, for the reason that it is often the case that they cannot be stopped on the incline in their descent, until after they pass the pit. Consequently, it is necessary or advisable to start the car down the incline, only after the haulage car is in the pit.

The object of the present invention is to provide a haulage system which will enable the cars to be handled in a much more economical manner, or in such a way as to effect a considerable saving in time, and to avoid the delays incident to the shifting of the cars from their position on the elevated track at a distance from the car dumper, onto the cradle of the car dumper.

The above objects are accomplished in a very effective manner by a car haulage plant or system embodying my invention, which may be here briefly summarized as consisting in certain novel combinations and arrangements of parts which will be described in the specification and set forth in the appended claims.

In the accompanying sheets of drawings, wherein I have shown one embodiment of my invention adapted to be employed in connection with a car dumper, Figure 1 is a partial side elevation and partial vertical longitudinal sectional view of that portion of the car haulage plant embodying my invention, the haulage car being shown in the act of pushing a loaded car up the upwardly inclined approach to the car dumper; Fig. 2 is a plan view of a portion of the same at and adjacent the point at which the haulage car passes down into the pit, or leaves the level of the tracks upon which the loaded cars are adapted to move, the parts being shown on a slightly enlarged scale; Fig. 3 is a vertical longitudinal sectional view of the same; Fig. 4 is a view similar to Fig. 2, but of that portion of the plant at and adjacent the lower or rear end of the pit; Fig. 5 is a view similar to Fig. 3, of that portion of the plant shown in Fig. 4; Figs. 6 and 7 illustrate details of the switching mechanism or of the switching sections of the car haulage track, Fig. 6 being a section substantially along the line 6—6 of Fig. 3, looking forwardly, and Fig. 7 being a detail elevation of one of the switch operating sections of the car haulage track, and its lift bar, the parts being viewed substantially from the position along the line 7—7 looking in the direction indicated by the arrow.

Referring now to the drawings, it will be seen that cars 10 which are the cars adapted to be handled in the car dumping plant, which in itself is not illustrated, are adapted to run along the track 11, which will be of standard gage, and is preferably elevated at and adjacent the part involving my invention, the track being mounted on a suitable foundation 12 of concrete or equivalent construction. The track 11 extends up along a trestle 13 which may be regarded as the approach to the car dumper. It will be observed that the track on the trestle and also a portion of the track a short distance in advance of the trestle is upwardly inclined. It is up this inclined portion of the track that the cars are adapted to be moved by the haulage car. The track immediately in advance of this part just referred to is preferably downwardly inclined, so that the cars may be run by gravity down to or substantially to the base of the upwardly inclined part, or to the point where they may be engaged and moved by the haulage car.

The haulage car which is shown at 14 is adapted to run along a narrow gage track 15, which is arranged centrally between the rails of a main track 11. This haulage car is adapted to be moved forwardly by a suitable cable, a portion of which is shown at 16, which cable is adapted to be wound on and unwound from a suitable engine driven drum 17, thence passes about suitable sheaves 18 and 19, and thence extends rearwardly, where it will be attached to the haulage car in any suitable manner. It is believed to be unnecessary to illustrate more in detail this cable, or the numerous sheaves which will be utilized along the trackway to guide the cable, as the cable and the sheaves would tend to confuse the parts in which the real invention is directly involved.

In accordance with the present invention, I use a much longer pit than heretofore, and in fact use a trench or open subway which is provided with a section of the track along which the haulage car may travel in one direction. In the drawings, the pit or trench is shown at 20, this pit extending beneath the main track for a distance in advance and also the rear of the point to which the loaded car may run by gravity or the base of the incline leading to the car dumper. The track for the haulage car includes an upper section which is in the plane of the main track 11 for the loaded cars, and a branch section 15$^a$ extending along the bottom of the trench or pit. The haulage car in traveling toward the car dumper runs over the upper track section, and in traveling away from the car dumper passes down an inclined section 15$^b$ of the track for the haulage car, and runs along the lower track to the far end of the pit. It is adapted to emerge from the far end of the pit or trench, or to pass from the lower to the upper track by traveling up an inclined section 15$^c$. In other words, assuming that a loaded car 10 is in substantially the position shown in Fig. 1, or in a position to be moved up the incline to the car dumper, the haulage car enters the pit at a point in advance of said car and emerges from the pit at a point in the rear of said car.

In order that the haulage car may have the path of movement above referred to, I utilize two sets of switching sections 15$^d$ and 15$^e$, which switch sections are preferably adapted to be automatically shifted, switching sections 15$^d$ being at the forward end of the pit, and in the plane of the upper track, and the sections 15$^e$ being near the rear end of the pit and being inclined upwardly and forwardly from the lower track section to the upper track section.

I may utilize various kinds of switching sections or switching tongues, but in the present case, the switching sections are laterally movable from a position in line with the track to a position outside of the track and vice versa. In order that the haulage car may travel forwardly along the upper section of the track, the switch sections 15$^d$ (see Fig. 2) must be in line with the rails of the upper track section, or directly over the inclined portion 15$^b$ leading down into the trench or pit, and in order that the haulage car may enter the forward end of the pit when moving rearwardly, the track sections 15$^d$ must be out of line with the rails of the upper track section, or be in the position shown in Fig. 2. As before stated, these switch sections are shifted automatically, and preferably this is accomplished by the coöperation of certain parts, including movable parts of the track which are actuated by the haulage car itself. In the present embodiment of my invention, the switching sections 15$^d$ are thrown laterally outward, or to the position shown in Fig. 2, when the said car in moving rearwardly rides over two pairs of movable track sections 15$^e$, which are just in advance of the entrance to the pit. These track sections 15$^e$ are pivotally mounted so that they may stand up above the level of the track in the form of a V, and are adapted to be depressed or moved downwardly to the level of the track by the haulage car, there being suitable play between the pivotal connections of these track sections 15$^e$ to allow the sections to be moved upwardly or to sink to the level of the track, as the car moves over the same.

The two switching sections 15$^d$ are moved inwardly, so that a car may run forwardly over the same, along the upper track section and above the branch leading into the entrance part of the pit, by two pairs of similar pivoted track sections 15$^f$, which are just at the rear of the pit entrance. The pivoted track sections 15$^e$ are connected to a vertically movable shifter bar 15$^g$, to the ends of which are connected bell cranks 15$^h$. In a somewhat similar manner, the track sections 15$^f$ are pivotally connected to vertically movable lifter bars 15$^i$, two separate bars being here employed for a purpose to be explained presently. To the outer ends of these lifter bars 15$^i$ are connected bell cranks 15$^k$, which are connected by shifter rods 15$^l$ to the forward set of bell cranks 15$^h$. Connected to these rods, opposite the switching sections 15$^d$ are bell cranks 15$^m$, connected to plungers 15$^n$ which slide in suitable guides 15$^p$, (see Fig. 6), and are directly connected to the switching sections 15$^d$. In Fig. 7, is shown the manner of connecting one of the track sections 15$^f$ to the lifter bar 15$^i$, to which the corresponding bell crank 15$^k$ is adapted to be connected.

From the above description, and the corresponding illustrations, it will be seen that when the haulage car moving forwardly, depresses the movable sections 15$^f$, the switching sections 15$^d$ are brought to a position to permit the car to move forwardly over the entrance to the pit, and at the same time the track sections 15$^e$ are elevated, and as the car moves over the sections 15$^e$, the latter are depressed, causing the said switching sections 15$^d$ to be moved laterally outward from a position in alinement with the upper track, and at the same time the track sections 15$^f$ are again elevated. Consequently, on the return of the haulage car, it passes down into the pit at its forward end.

In order that the haulage car may pass to the extreme end of the pit, beyond the inclined track sections 15$^c$, these track sections 15$^c$, which were previously referred to as switching sections, must be capable of movement laterally outward or away from a position of alinement with the rails of the upper and lower track section, so as to permit the car to travel past the same along the rails of the lower track section, and in order that the haulage car may thence in its forward movement from the rear end of the pit move up onto the upper track section, the said switching sections 15$^c$ must be moved inwardly toward each other into alinement with or into the planes of the rails of the upper and lower track sections. By referring to Figs. 4 and 5, it will be seen that these switching sections 15$^c$ are moved into alinement with the rails of the track by two vertically movable track sections 15$^q$, which are depressed as the haulage car reaches the end of the pit. It will be seen also that after the haulage car reaches the upper section of the track, the said switching sections 15$^c$ are adapted to be moved out of alinement with the rails of the track, or away from the planes of the track rails, by two pairs of movable track sections 15$^r$, which are similar to the track sections 15$^e$ and 15$^f$, previously described, and which are depressed by the haulage car as it travels forwardly after emerging from the pit. At the same time, by depressing the track sections 15$^r$, the track sections 15$^q$ are again elevated. This is accomplished by mechanism connected to the movable track sections 15$^r$ and 15$^q$, and to the switching sections 15$^c$, very similar to the mechanism connecting the movable sections 15$^e$ and 15$^f$, and the switching sections 15$^d$. In other words, the track sections 15$^q$ are connected to a vertically movable lifter bar, and the track sections 15$^r$ are connected to short vertically movable shifter bars, to the ends of which are connected bell cranks 15$^s$ which are connected together by shifter rods 15$^t$, which in turn are connected to bell cranks 15$^v$. These bell cranks are connected to plungers 15$^w$ which slide in guides similar to the guides 15$^p$, and are attached to the switching sections 15$^c$, in the same manner as the plungers 15$^n$ are connected to the switching sections 15$^d$.

It is believed that the method of operation will be clearly understood from the previous description, considered in connection with the drawings, and that further description of the same will be unnecessary. It may be said, however, that with this construction, as soon as the haulage car starts to move a loaded car forwardly toward the car dumper, the next loaded car can be started down the incline and can be brought to a stop at the foot of the incline, leading to the car dumper, but nevertheless this car will not interfere with the movement of the haulage car, from a position in front of said car to a position at the rear thereof. It will be apparent therefore, that by thus simultaneously shifting the cars, or by bringing one car to a position to be moved by the haulage car, while the preceding car is being moved by the haulage car, a great deal of time heretofore lost in the handling of the cars can be saved.

It will be observed that the middle of the upper track section is open from a point at which the haulage car enters the pit to the point from which it emerges from the pit. This is required in order that there may be free unobstructed movement of the haulage cable to which the haulage car is connected. It will, of course, be apparent that any overhead structure, in the nature of ties or other members extending across the track above the lower track section, would interfere with the movement of the haulage cable, and prevent the haulage car being admitted to the pit at one point, and removed therefrom at another point.

While I have shown one embodiment of my invention, it will be understood that numerous changes can be made, especially in the manner of shifting, mounting and operating the switching sections of the track, and I do not desire to be confined to any details, except as I am expressly limited by the terms of the appended claims.

Having thus described my invention, what I claim is:

1. In a car haulage plant, a main track for a car to be moved, and tracks for a haulage car including a section between the rails of the main track and a lower branch section beneath the upper section, said upper and lower sections being connected by inclined track portions by which the haulage car leaves the upper section at one point and passes onto the lower section, and leaves the lower section and passes up onto the upper section at a different point.

2. In a car haulage plant, a main track for a car to be moved, and tracks for a haulage car including an upper portion, and a branch portion beneath the same, and switches by which the haulage car may leave the upper portion of the track, and pass along the lower portion, and thence pass upwardly to the upper portion at a point beyond the point at which the haulage car left the upper portion.

3. In a car haulage plant, a main track for a car to be moved, a haulage track including a section in substantially the plane of the main track, and a lower section beneath the same, and switches by which the haulage car moving in one direction, leaves the upper track section, passes along the lower track section, and again passes up onto the upper track section at a point beyond the point at which the car left the upper track section.

4. In a car haulage plant, a main track for a car to be handled, including an upwardly inclined part, a car haulage track including an upper section and a branch section beneath the same, and haulage track switches by which a haulage car in moving rearwardly down the inclined portion of the main track traverses down onto the lower track section at a point in advance of the foot of the inclined portion of the main track, and passes upwardly onto the upper section at a point beyond said inclined portion of the main track.

5. In a car haulage plant, a main track for cars to be handled, including a portion inclined upwardly, a narrow gage car haulage track including a section between the rails of the main track, and a lower branch section beneath the rails of the upper section, the said upper and lower sections being connected by inclined track portions by which the haulage car leaves the upper section and passes onto the lower section at one point, and leaves the lower section and passes up onto the upper section at a different point, the said points of leaving and entering onto the upper section being a greater distance apart than the length of the car to be handled.

6. In a car haulage plant, a main track for a car to be handled, a car haulage track including an upper section, and a lower branch, together with inclined portions by which the haulage car may leave the upper section at a point in advance of the car to be handled, and returned to the upper section at a point in the rear of a car to be handled, and switches by which the car in moving rearwardly passes onto the lower section, and when moving forwardly passes up onto the upper section.

7. In a car haulage plant, a main track for a car to be handled, a haulage track including an upper section and a lower section beneath the upper section, automatically operated switches by which the haulage car in passing rearwardly, leaves the upper section and passes along the lower section, and by which said haulage car passes upward onto the upper section, and may thence travel along the upper section in a forward direction past the point at which it had previously left the upper section.

8. In a car haulage plant, a main track for a car to be handled, a haulage car track including an upper section between the rails of the main track, and a lower section beneath the upper section, switches by which the haulage car in moving in one direction leaves the upper section, and passes down onto the lower section, and leaves the lower section and passes up onto the upper section at a distance from the point at which it left the upper section, which distance is greater than the length of the car to be handled, and means by which the haulage car automatically operates said switches.

9. In means for bringing up cars to predetermined points, an approach track to the same, a subway for a pusher car along the line thereof having passageways at its ends to the approach track above, a main pusher track intermediate of the approach track and extending through the said passageway nearer said points to and along the subway to the farther passageway therein, a secondary pusher track, intermediate of the approach track, between said passageways, together with switch connections through said farther passageway between said main and secondary tracks and between said tracks across said nearer passage, substantially as shown and described.

10. A means for bringing up cars to tipples comprising an approach track, a subway for a pusher car along the line thereof with passageways for said car at its ends to the track above, a main pusher track intermediate of the approach track and extending through the said passageway nearer the tipple to and along the subway to the farther of said passageways therein, a secondary pusher track, intermediate of the approach track, between said passageways; switch connections between said main and secondary tracks, through said farther passageway, and between said tracks across said nearer passageway, a pusher car, adapted to traverse said tracks and switches for the same, together with suitable means for propelling said car upwardly thereon, substantially as shown and described.

In testimony whereof, I hereunto affix my signature in the presence of two witnesses.

FREDERICK W. LOVELL.

Witnesses:
A. J. HUDSON,
A. F. KWIS.